United States Patent
Nagasaka et al.

[19]

[11] Patent Number: 6,157,744
[45] Date of Patent: *Dec. 5, 2000

[54] METHOD AND APPARATUS FOR DETECTING A POINT OF CHANGE IN A MOVING IMAGE

[75] Inventors: Akio Nagasaka, Kokubunji; Takafumi Miyatake, Hachioji; Kazuaki Tanaka, Yokohama; Takehiro Fujita, Kokubunji; Shigeki Nagaya, Tukuba, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/604,606

[22] Filed: Feb. 21, 1996

[30] Foreign Application Priority Data

Feb. 21, 1995 [JP] Japan .................................. 7-032027

[51] Int. Cl.$^7$ ...................................................... G06K 9/36
[52] U.S. Cl. ......................... 382/236; 348/700; 382/278; 386/51
[58] Field of Search ............................. 348/97, 154, 155, 348/700; 353/21; 360/13; 364/514 A, 514 R; 382/103, 107, 236, 278; 369/83; 386/4, 52, 64, 51; 395/173, 328, 806

[56] References Cited

U.S. PATENT DOCUMENTS 5,083,860  1/1992  Miyatake ............................... 352/129
5,099,322  3/1992  Gove ...................................... 348/700
5,635,982  6/1997  Zhang et al. ........................... 348/231
5,642,294  6/1997  Taniguchi et al. ...................... 348/700

FOREIGN PATENT DOCUMENTS 0590759  4/1994  European Pat. Off. .
0637027  2/1995  European Pat. Off. .

*Primary Examiner*—Jon Chang
*Assistant Examiner*—Jayanti K. Patel
*Attorney, Agent, or Firm*—Antonelli, Terry, Stout & Kraus, LLP

[57] ABSTRACT

A system for detecting a point of change between video shots from a video having a plurality of succeeding frames. The system includes video playback apparatus for playing a video chronologically one frame at a time, and a display for displaying the video. The a processing device for calculating a feature quantity of video image data for each frame, determining a first correlation coefficient between a feature quantity of a current frame and a feature quantity calculated from an immediately preceding frame and determining a second correlation coefficient between the feature quantity of the current frame and a feature quantity of at least two frames preceding the current frame, and indicating on the display a point of change between video shots when the first correlation coefficient and the second correlation coefficient are out of predetermined allowable ranges. The correlation coefficients of each frame is stored and can be used by the processing device to dynamically change a reference used for detecting a point of change between video shots. The change in the reference is performed based on the stored correlation coefficients or feature quantities of past frames.

44 Claims, 8 Drawing Sheets

METHOD AND APPARATUS FOR DETECTING A POINT OF CHANGE IN A MOVING IMAGE

CROSS REFERENCE TO RELATED APPLICATIONS

This application is related to application Ser. No. 08/323,866, filed Oct. 17, 1994, the disclosure of which is incorporated herein by reference.

BACKGROUND OF THE INVENTION

The present invention relates to a video edit system and a video browsing method which are capable of locating the head of each video or movie shot, included in a video having a plurality of video or movie shots, wherein each video or movie shot includes a series of uninterrupted video images photographed by one camera. More particularly, the present invention relates to a method and apparatus for detecting a point of change between video shots from a video stored on a video tape or video disk, wherein the video includes a plurality of succeeding frames.

With computer operation speed growing faster and the capacity of memory increasing in recent years, attention is now being focused on database systems and presentation tools which can handle movie and video information. Such information can not be sufficiently handled with conventional systems. Searching for only a desired part of a vast amount of video information and editing is a time-consuming task.

Among the methods to alleviate editing work by using a computer, a method disclosed in "Automatic Video Indexing and Full-Video Search for Object Appearances," Joho Shori Gakkai Ronbunshi (Collection of Papers, published by Information Processing Society), Vol. 33, No. 4, and Japan Patent Laid-Open No. 111181/1992 entitled "Change Point Detection Method in a Video" has been proposed. The above disclosed method involves automatically dividing a video for individual shots, preparing a list of images each representing a shot, and using them like indices of a book to aid in searching and editing of the video. The above disclosed method allows one to grasp the contents of a video at a glance using the list and to locate a desired scene. It is also possible to handle the video in units of a shot, which is an appropriate length for handling, and thereby make rough editing easy.

To divide the video into shots requires detecting a point of change between video shots in a video, i.e., a change in appearance of a first video shot relative to a second video shot. A conventional method of detecting a point of change between video shots in a video, as described in the above-mentioned Japan Patent Laid-Open No. 111181/1992, is based on a technique that decides that there is a point of change between video shots, i.e., a change in appearance between two succeeding frames of a video (frames are still images making up the motion picture wherein in television 30 images are displayed in each second) when there is an image difference between the two frames.

The above disclosed method, however, has a drawback in that it picks up as a point of change video shots having instantaneous disturbances of an image caused by strobe flashes produced when photographs are taken. These disturbances are such as those frequently encountered in press conferences, and by equipment trouble. Such image disturbances tend to occur successively during one shot, resulting in unwanted division of one shot. In a period of a video in which generally dark images of a night scene continue, the image difference between succeeding frames tends to be smaller than that of bright scenes. Hence, if the same reference is used for both dark scenes and bright scenes in determining a point of change, bright scenes may induce an overly sensitive reaction resulting in an erroneous detection of the point of change, while in dark scenes the point of change may fail to be detected.

SUMMARY OF THE INVENTION

The object of the present invention is to provide a method and apparatus to detect a point of change between video shots from a video consisting of a plurality of succeeding frames.

Another object of the present invention is to provide a method and apparatus to detect a point of change between video shots from a video in such a manner to prevent erroneous detection of a point of change between video shots from a video due to an instantaneous image disturbance.

Yet another object of the present invention is to provide a method and apparatus to detect a point of change between video shots from a video without degrading the detection sensitivity below that of the conventional technique.

Still yet another object of the present invention is to provide a method and apparatus to detect a point of change between video shots from a video that can respond flexibly to a change in characteristics of the video.

To achieve the above-described objects, the present invention provides a method having the steps of inputting a video chronologically one frame at a time into a processing device, calculating a feature quantity of video image data for each frame, determining a correlation coefficient between the feature quantity of a current frame and the feature quantity of an immediately preceding frame, determining a second correlation coefficient between the feature quality of the current frame and a feature quality of at least two frames preceding the current frame and indicating a point of change between video shots when the first correlation coefficient and the second correlation coefficient are out of predetermined allowable ranges.

To further achieve the above-described objects the present invention provides a system for detecting a point of change between video shots from a video consisting of a plurality of succeeding frames. The system includes a video playback apparatus for playing a video chronologically one frame at a time, a display for displaying the video, and a processing device for calculating a feature quantity of video image data for each frame, determining a first correlation coefficient between a feature quantity of a current frame and a feature quantity calculated from an immediately preceding frame, determining a second correlation coefficient between the feature quantity of the current frame and a feature quantity of at least two frames preceding the current frame, and indicating on the display a point of change between video shots when the first correlation coefficient and the second correlation coefficient are out of predetermined allowable ranges.

The present invention also provides a computer program product for use with a computer having a display. The computer when executing the computer program detects a point of change between video shots from a video consisting of a plurality of succeeding frames. The computer program includes a computer readable medium with the computer program recorded thereon. The computer program includes a first code section for inputting a video chronologically one frame at a time into a processing device, a second code section for calculating a feature quantity of video image data for each frame, a third code section for determining a first correlation coefficient between a feature quantity of a current frame and a feature quantity calculated from an immediately preceding frame and determining a second correlation coefficient between the feature quantity of the current frame and a feature quantity of at least two frames preceding the current frame, and a fourth code section for indicating a point of change between video shots when the first correlation coefficient and the second correlation coefficient are out of predetermined allowable ranges.

When there is an instantaneous image disturbance, there is a characteristic that an image difference between a disturbed frame and an immediately preceding or following frame is larger than an image difference between two frames having the disturbed frame between them. Thus, according to the present invention, when a pattern of combination of correlation coefficients representing such a state is detected, it is possible to correctly decide that the detected change is not a true point of change between video shots. Conversely, it is possible to detect only the part where such an image disturbance has occurred. Further, by dynamically changing the threshold for detecting the point of change between video shots according to the feature of the immediately preceding frame, it is possible to make a precise decision, according to the features of the video image, on whether or not the object being checked is a point of change, thereby minimizing erroneous detection.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Figure 1:
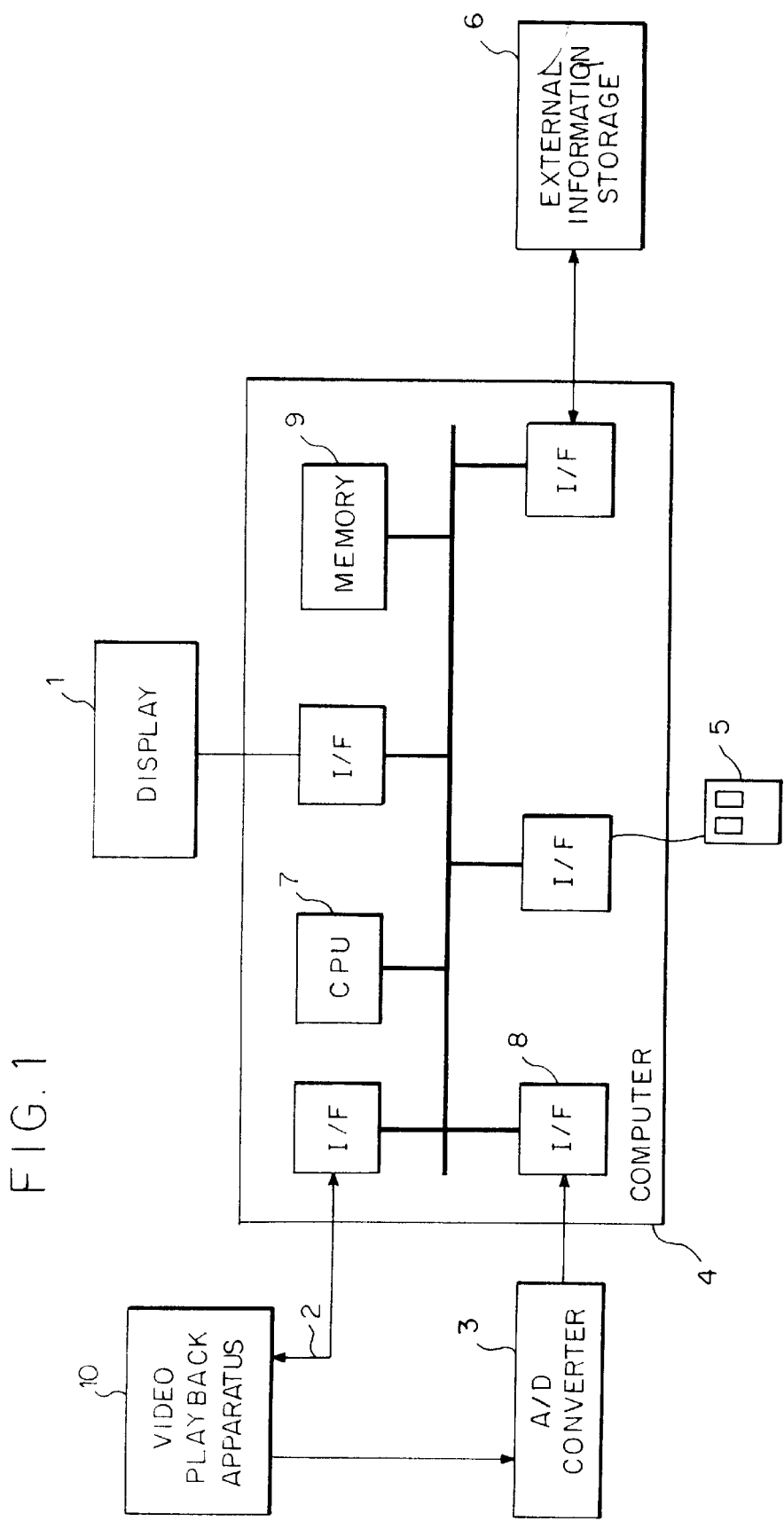
FIG. 1 is a system block diagram of the present invention.

FIG. 1 is a block diagram of one type of system configuration that can implement the features of the present invention. Reference numeral 1 represents a display device that displays an output screen for a computer 4. Instructions for the computer 4 are entered from an input device 5 such as a keyboard and a pointing device, for example, a mouse. A video playback apparatus 10 is an optical disk or video cassette recorder (VCR). Video signals output from the video playback apparatus 10 are successively converted by an A/D converter 3 into digital image data, which is then supplied to the computer 4. In the computer 4, the digital image data is entered through an interface 8 into a memory 9 and processed by a central processing unit (CPU) 7 according to a program stored in the memory 9. When the frames of video handled by the video playback apparatus 10 are successively assigned with frame numbers, beginning with the head of the video, the video of a desired scene is replayed by sending the corresponding frame number to the video playback apparatus 10 through a control line 2. A variety of information may be stored in an external information storage 6, as required by the processing. The memory 9 stores various data generated by the processing described below and which is referenced as necessary.

First, described in detail will be the point of change detection processing, which can prevent erroneous detection of an instantaneous image disturbance as a point of change during the process of detecting a point of change between video shots in a video.

Figure 2:
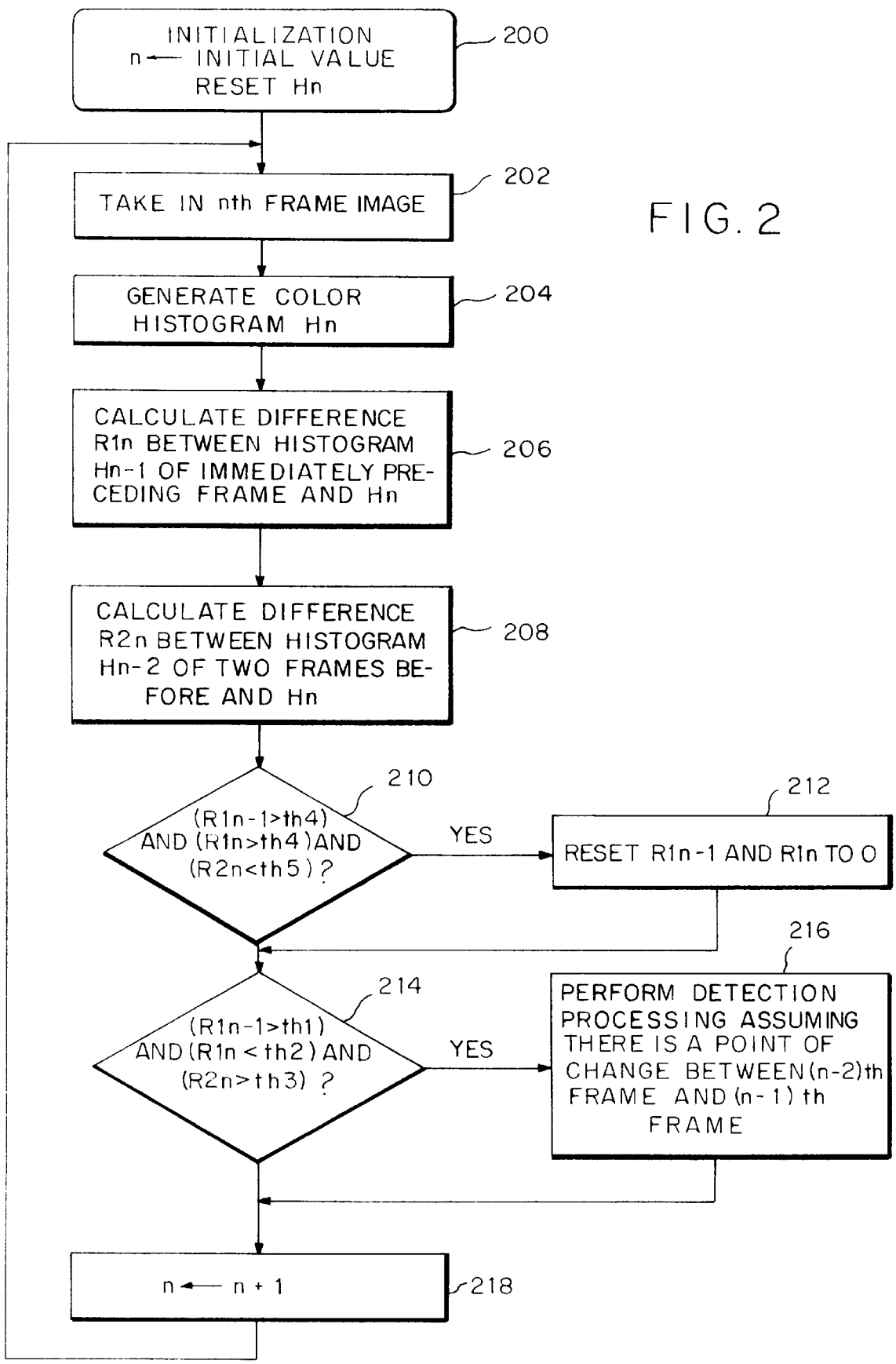
FIG. 2 is a flowchart of a point of change detection computer program of the present invention that is robust or tolerant of instantaneous disturbances.

FIG. 2 is an example of a flowchart of a computer program for detecting a point of change between video shots in a video when the computer program is executed in the system shown in FIG. 1. The computer program is stored in the memory 9 and specifically is executed by the CPU 9. The CPU 7, when executing sections of code of the computer program, first as an initializing process, initializes a variable n representing the frame number of a shot currently being processed to reset the memory area used for histogram (step 200). The initial value for n is given a start frame number of the video interval to be processed. Next, the CPU 7 takes in a frame image fn of the frame number n (step 202) and generates a color histogram Hn for the frame image fn (step 204). The color histogram determines the frequency that the pixel representing the same color appears in one whole frame image. For example, when a 64-color histogram with red (R), green (G) and blue (B) assigned with two bits each is to be generated, the RGB color values of individual pixels of the frame are reduced to 6-bit 64colors represented by only higher-order two bits of R, G and B, and for each of the 64 colors the number of pixels representing the color after reduction is counted. In this case, the color histogram is represented by arrangement Hn(i) where i takes an integer from 0 to 63. For example, the frequency Hn(0) when i is 0 represents how many pixels there are in the frame whose higher-order two bits of the RGB color values are zero for all R, G and B. Next the CPU 7 determines a difference R1n between the color histogram Hn and the color histogram Hn−1 of a frame fn−1 one frame before the current frame fn (step 206). Further, the CPU 7 calculates the difference R2n between Hn and the color histogram Hn−2 two frames before the current frame fn (step 208). The differences R1n and R2n between histograms can be determined from a calculation such as the $x^2$ test. Various kinds of calculations are described in the above-mentioned literature and hence a detailed explanation is omitted here.

Figure 3:
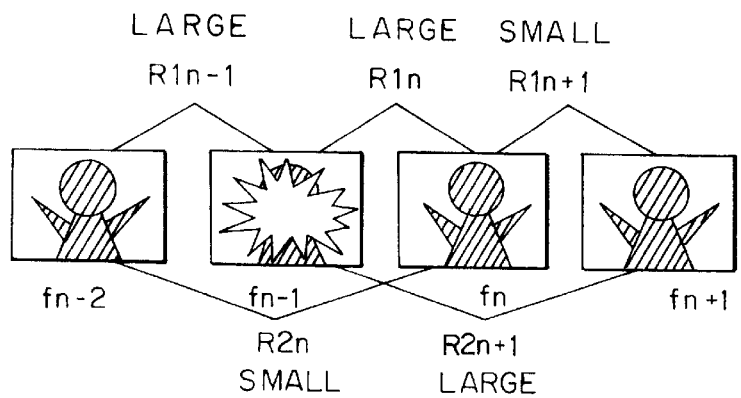
FIG. 3 is a schematic diagram of a video having a part where an instantaneous disturbance has occurred.

FIG. 3 schematically illustrates a change with time of frame images when an instantaneous image disturbance occurs. There is a disturbance in frame fn−1. In this case, the difference between frames fn−2 and fn−1 is large and R1n−1 exhibits a large value. Further, the difference between frames fn−1 and fn is large and R1n shows a large value. However, frames fn−2 and fn are similar and R2n assumes a small value.

Figure 4:
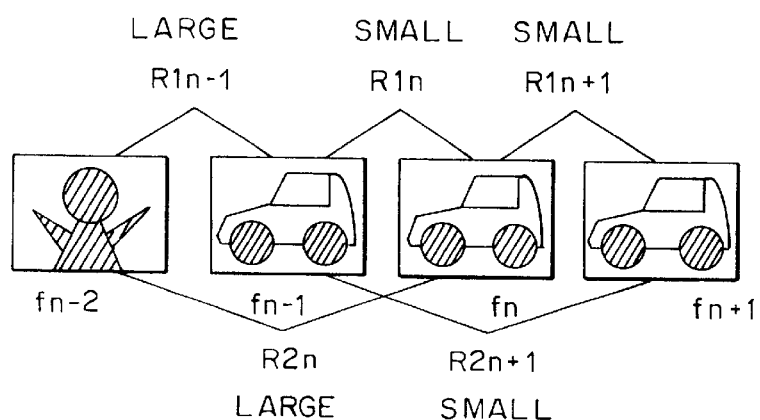
FIG. 4 is a schematic diagram of a video having a art where there is a normal point of change between video shots.

FIG. 4 schematically illustrates a change with time in frame images including a change in video shots. The changes in video shots has occurred between frames fn−2 and fn−1. At this time, the difference between frames fn−2 and fn−1 is large and R1n−1 exhibits a large value. Frames fn−1 and fn, however, are similar and R1n assumes a small value. The difference between frames fn−2 and fn is large and R2n takes a large value. The conventional method focuses on only the value of R1n and thus cannot distinguish between the cases of FIGS. 3 and 4, namely detecting the point between fn−2 and fn−1 as the point of change between video shots. By using R2n in making the decision, it is possible to distinguish between FIGS. 3 and 4. That is, if R1n−1 and R1n are both larger than a threshold th4 and R2n is smaller than a threshold th5, this is judged as an instantaneous disturbance (step 210). If R1n−1 is greater than a threshold th1, R1n is smaller than a threshold th2 and R2n is larger than a threshold th3, it is decided that there is a change in video shots between frames fn−2 and fn−1 (step 214), and the processing associated with the detection of the point of change between video shots is performed (step 216).

Of course, by using only the conditions of (1) whether R1n−1 and R1n are both large and (2) whether R1n−1 is large and R1n is small, the point of change between video shots may be located, i.e., the condition of (1) may be recognized as FIG. 3 and the condition of (2) as FIG. 4. The additional use of the R2n value makes the decision very reliable because it can confirm the return of the image to normal after disturbance. If the CPU 7 determines via step 210 the detected change to be an instantaneous disturbance, R1n−1 and R1n are reset to zero (step 212). If R1n−1 and R1n are not reset, a resulting combination in which R1n is large, R1n+1 is small and R2n+1 is large, as shown in FIG. 3, causes the CPU 7 via the step 214 in the next n+1st frame processing to detect the point between frames fn−1 and fn as a change in video shots.

The above-described processing makes it possible to reliably detect a point of change between video shots even when there are instantaneous disturbances in video images. By performing the above described processing a part where instantaneous disturbance has occurred can also be located. The most typical case of instantaneous disturbance is when a camera strobe flashes as in a press conference. Because a strobe flashing occurs when a newsman thinks the scene is important, the part of the video where the flash occurs is often an important scene. Hence, this may be used as one of the means to pick up important scenes from the video. Another typical case of instantaneous disturbance is an intentional one used to have a psychological effect on viewers, such as illegal subliminal advertising on television. This is said to be able to act subliminally on the consciousness of viewers without them being aware of it by inserting one frame of a special image in the video at certain intervals, thereby bringing them under a sort of hypnotism. The above-described processing can also be used to automatically check if the video contains any such unlawful effects and thereby prevent broadcasting of such a video.

Figure 5:
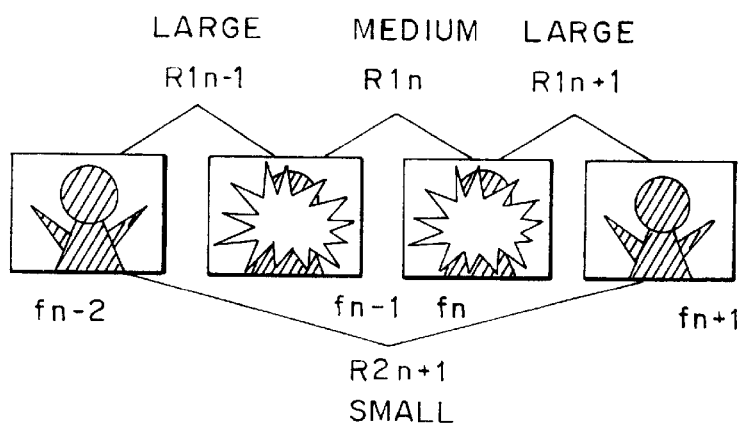
FIG. 5 is a schematic diagram of a video having a part where disturbances have occurred over a plurality of frames.

The above describes a situation where the disturbance lasts only one frame for simplicity. By setting the frame interval long in calculating R2n, it is possible to deal with disturbances lasting any number of frames in a similar way. In the example illustrated in FIG. 5, there are disturbances in two frames fn−1 and fn. R2n+1 that determines the difference between frames on both sides of these disturbances assumes a small value, while R1n−1, R1n and R1n+1 take relatively large values. From this combination of frame-to-frame differences, it is possible to decide if the detected change is a disturbance in image or a point of change. In this way, by successively increasing the interval or the number of frames to be skipped in calculating R2n, as from one-frame jump to two-frame jump, it is possible to distinguish a disturbance lasting an arbitrary number of frames from a point of change between video shots.

After the above-described processing, the CPU 7 increments by one the frame number to be processed and prepares to take in the next frame (step 218).

The computer program, executed by the CPU 7 so as to perform the point of change detection method illustrated in FIG. 2, includes various code sections corresponding to the steps. The code sections are written in a computer programming language executable by the CPU 7. For example, the code sections corresponding to the steps 200–214 and 218 can be written in a high speed, low level computer programming language such as C or assembly language. The code section corresponding to step 216 can be written in a low speed, high level computer programming language such as BASIC or some other interpretive language.

Next, a detailed description will be provided of a point of change detection processing, which flexibly responds to changes in the characteristic of the object video to correctly detect a point of change between video shots, as by suppressing overly sensitive detection of a change in a bright scene and preventing a failure to detect a change in a dark scene.

Figure 6:
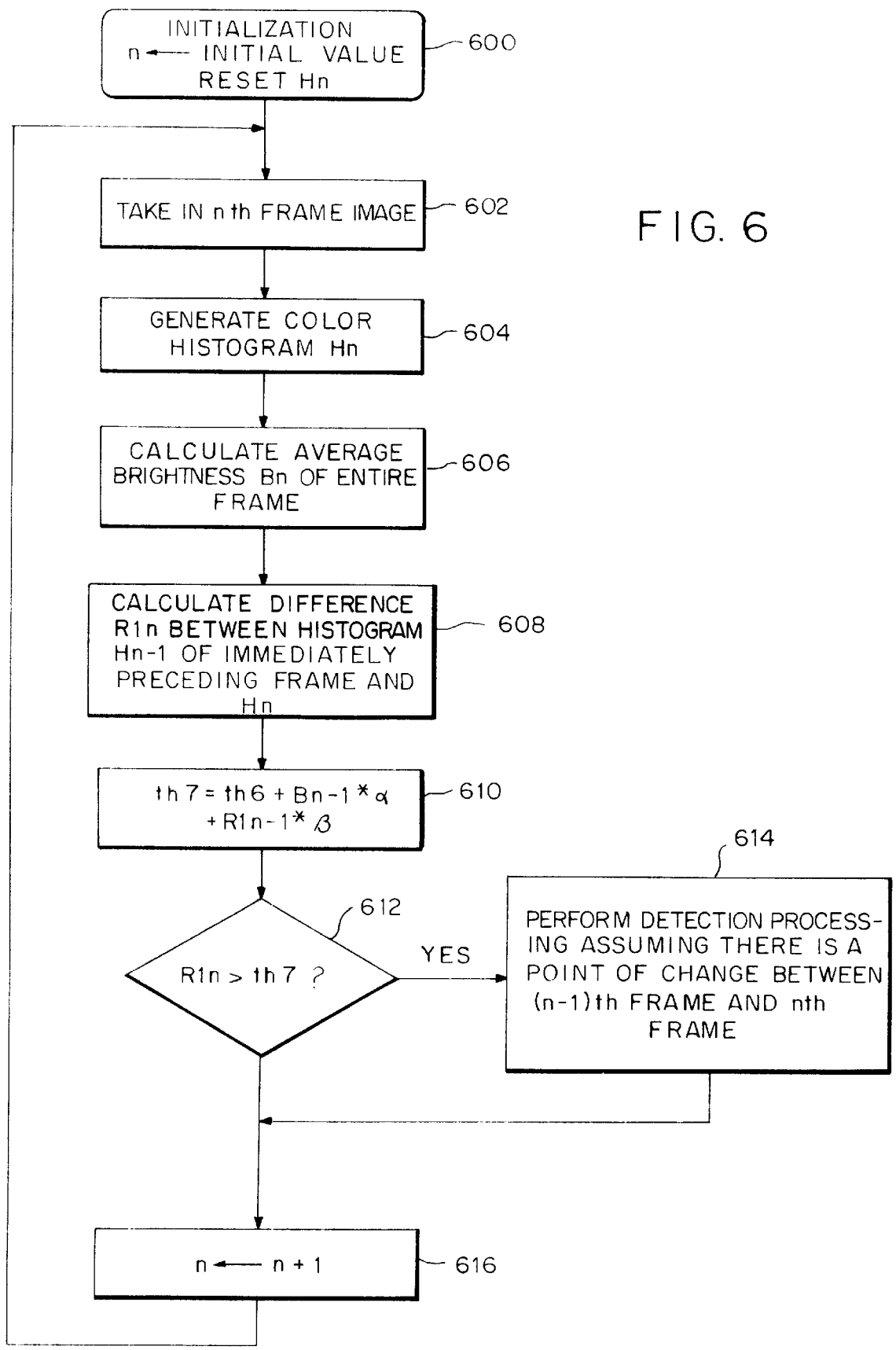
FIG. 6 is a flowchart of a point of change detection computer program in which the threshold is changed according to the features of a preceding video frame.
Figure 7:
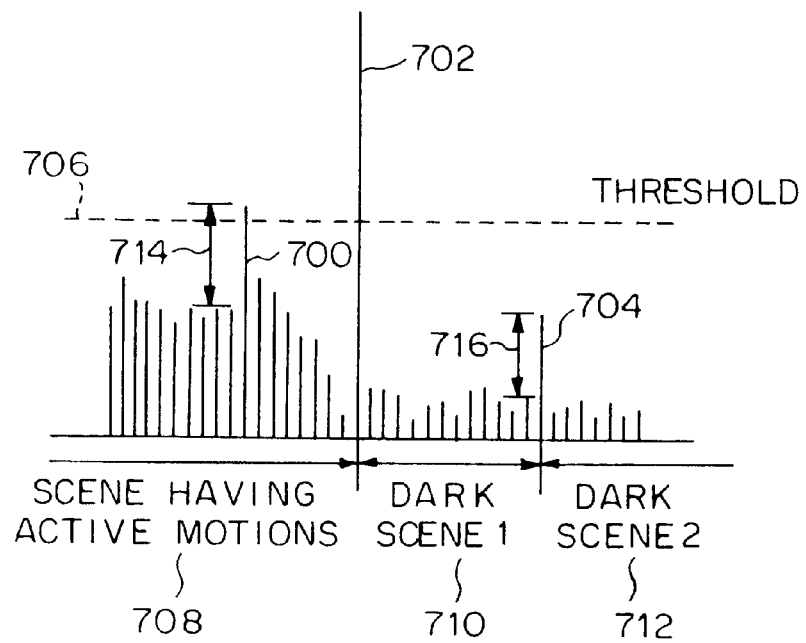
FIG. 7 is a diagram showing a typical example of transition with time of the correlation coefficient.

FIG. 6 illustrates an example flowchart of a computer program for detecting a point of change between video shots in a video when the computer program is executed in the system shown in FIG. 1. The basic flow of the computer program is similar to the previous flowchart of FIG. 2, except that the threshold for determining the point of change between video shots in a video is variable in FIG. 6 while that of FIG. 2 is fixed. The advantage of using a variable threshold is explained by referring to FIG. 7. FIG. 7 takes for example a video consisting of three shots in a row, namely a bright scene with active motions 708, a dark scene 1 710, and a dark scene 2 712 and shows a typical change with time of the correlation coefficient between frames. In FIG. 7, 702 and 704 represent the positions where the shot changes.

In a scene with active motions, the image difference between succeeding frames is large. Hence, in the interval of 708 the correlation coefficient continues to have relatively large values. In the dark scene, on the other hand, colors making up the frame image fall into only a few kinds centering around black, so that the shapes of histograms are similar and the correlation coefficients in the interval of 710 and 712 assume small values. In these intervals, the correlation coefficient is relatively small even at the point of change in video shots for the above reason. Where the threshold for determining a change in video shots is fixed at a constant value as shown by a broken line of 706, if the threshold is set relatively high, the point of change such as 704 in a dark scene may fail to be detected and if on the contrary the threshold is set relatively low, a part of the correlation coefficients like 700 in the interval where there is an active movement may result in an overly sensitive response.

As a method of suppressing an overactive detection in a scene with active motions, the above-mentioned Japan Patent Laid-Open No. 111181/1992 proposes a method that calculates the rate of change between the immediately preceding correlation coefficient and the present correlation coefficient and, when the rate of change exceeds an allowable value, decides that the detected change represents the change in video shots. In this method, the value of the correlation coefficient represents the amount of change in an image per unit time and thus corresponds to the moving speed of the camera or an object in the video. In many cases, because the moving speed of the camera or an object in the video does not change so greatly, the rate of change assumes a small value whether or not the scene has a motion, with only the value at the change of shot rising sharply. Hence, it is possible to use the same threshold for dark scenes and for scenes with active motions.

There are, however, numerous cases where the image sharply changes as when the camera is moved or an object passes in front of the camera. In such cases, the rate of change 714 of 700 with respect to the immediately preceding correlation coefficient may be equal to or larger than the rate of change 716 in a dark scene. It is therefore necessary to deal flexibly with changes in the characteristic in each scene of video and thereby change the threshold in response to the characteristic change.

The CPU 7 when executing the computer program represented by the flowchart illustrated in FIG. 6, will now be explained.

First, as an initializing process, the CPU 7 when executing the computer program, sets the variable n representing the frame number of the current shot to be processed to an initial value to reset the memory area used in the histogram (step 600). The initial value for n is given a start frame number of the video interval to be processed. Next, the CPU 7 when executing the computer program takes in a frame image fn of the frame number n (step 602) and generates a color histogram Hn for the frame image fn (step 604). This is followed by the CPU 7 determining the average brightness level Bn of the frame Fn (step 606). A detailed flowchart of the step 606 is illustrated in FIG. 8.

Figure 8:
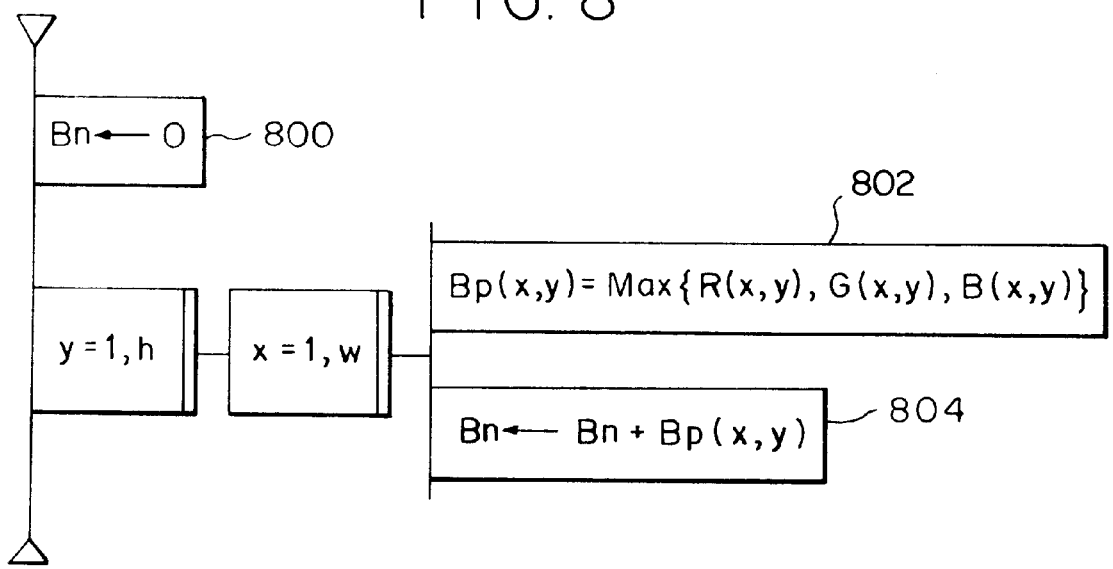
FIG. 8 is a flowchart of a computer program to determine the brightness of the entire frame.

As per FIG. 8, suppose that the frame image fn has a width w and a height h. First, the variable Bn is reset to 0 (step 800). Then, a brightness level Bp(x, y) is determined for each pixel in the frame Fn, where (x, y) represents a two-dimensional plane coordinates of a pixel in the frame fn. Bp(x, y) represents a brightness of a pixel when frame fn is a monochromatic image and, when it is a color image, a luminance component of a color of the pixel. If an image is represented by a system in which the luminance component is separated, as in a YUV color system, the value of the luminance component may be used as is, i.e., in the YUV color system, the value of Y is used. In the RGB color system commonly employed in computers, it is necessary to calculate the luminance component from the value of each RGB component. In the example indicated by, according to step 802, the maximum value of each RGB component is taken as the luminance value. R(x, y) represents a red component of a pixel located at a position (x, y); and similarly, G(x, y) represents a green component and B(x, y) represents a blue component. Because the luminance of a pixel is almost proportional to the green component, the value of the green component may be used approximately as the value of Bp(x, y). The value of Bp(x, y) determined in this way is added to Bn (step 804) to obtain the ultimate luminance Bn of the entire frame. The above processing may be performed simultaneously with the calculation of the color histogram of step 604 to eliminate the repetition of processing such as reading of value of each pixel and incrementing of variables x and y, thus speeding up the processing.

Next the CPU 7 calculates the difference R1n between the histogram Hn−1 of immediately preceding frame and the histogram Hn of the current frame fn (step 608). Next, the CPU 7 changes the threshold according to the feature of the immediately preceding video image (step 610). In this example, the brightness and the motion of the immediately preceding video image are used as feature quantities, and according to an equation th7=th6+Bn−1*α+R1n−1*β, a new threshold th7 is obtained. The threshold then is given a value that permits best processing for a video image with a standard level of brightness and a small motion. α is a weight value indicating by how much the threshold th6 is varied up or down for a change in brightness; and β is a weight value that determines by how much the threshold th6 is varied for a certain magnitude of motion. If there are other factors that require the threshold to be changed, any necessary number of factors are added to the equation.

For instance, the number of frames to be processed for the immediately preceding video image is one of the important factors. There are 30 frames per second for the video image of NTSC system. Depending on the capability of the computer, the timing of taking in the next frame may pass while calculating the correlation coefficient between frames. In this case, if the video image is replayed at an ordinary speed, the frame-to-frame correlation coefficient to be calculated is of course the one with one frame skipped. That is, the number of frames to be processed may be 30 frames per second or several frames per second depending on the processing capability of the computer.

The wider the interval of frames to be compared, the greater the image difference will be, so that the value of the correlation coefficient tends to increase as the number of frames to be processed in the interval decreases. Therefore, in such an interval, an overactive detection can better be prevented by setting the threshold relatively high. When the number of frames to be processed does not change greatly while the program is being executed, if the computer's capability is known, the threshold th6 may be changed at the initial stage to eliminate the need for considering changing the th6 at the time of calculating the th7.

The CPU 7 checks to see if the R1n is greater than the th7 calculated as described above (step 612). If it is, the system decides that there is a change in video shots between n−1th frame and nth frame, and performs the change detection processing (step 614). Finally, the CPU 7 increments by one the frame number to be processed and prepares for taking in the next frame (step 616).

The computer program represented by the flowchart illustrated in FIG. 6 includes various code sections corresponding to the steps. The code sections are written in a computer programming language executable by the CPU 7. For example, the code sections corresponding to steps 600–612 and 616 can be written in a high speed, low-level computer programming language such as C or assembly language. The code section corresponding to step 614 can be written in a low speed, high level computer programming language such as BASIC or some other interpretive language.

While in the above described processing, the threshold value is changed according to the feature of only one frame immediately preceding frame fn, it is possible to change it based on the history of the feature of an arbitrary number of immediately preceding frames. For example, as a measure of intensity of motion, the average value and maximum value of the correlation coefficient for several preceding frames may be used in stead of R1n−1 in the equation of step 610. The threshold for R1n may also be changed based on the features of the frames fn+1, fn+2, . . . immediately following the fn. With this method, when the R1n exceeds the threshold, it is decided retrospectively that there was a change in shot between fn−1 and fn.

Further, while the above described processing changes the threshold, it is possible to fix the threshold at a constant value and instead change the value of the correlation coefficient.

Figure 9:
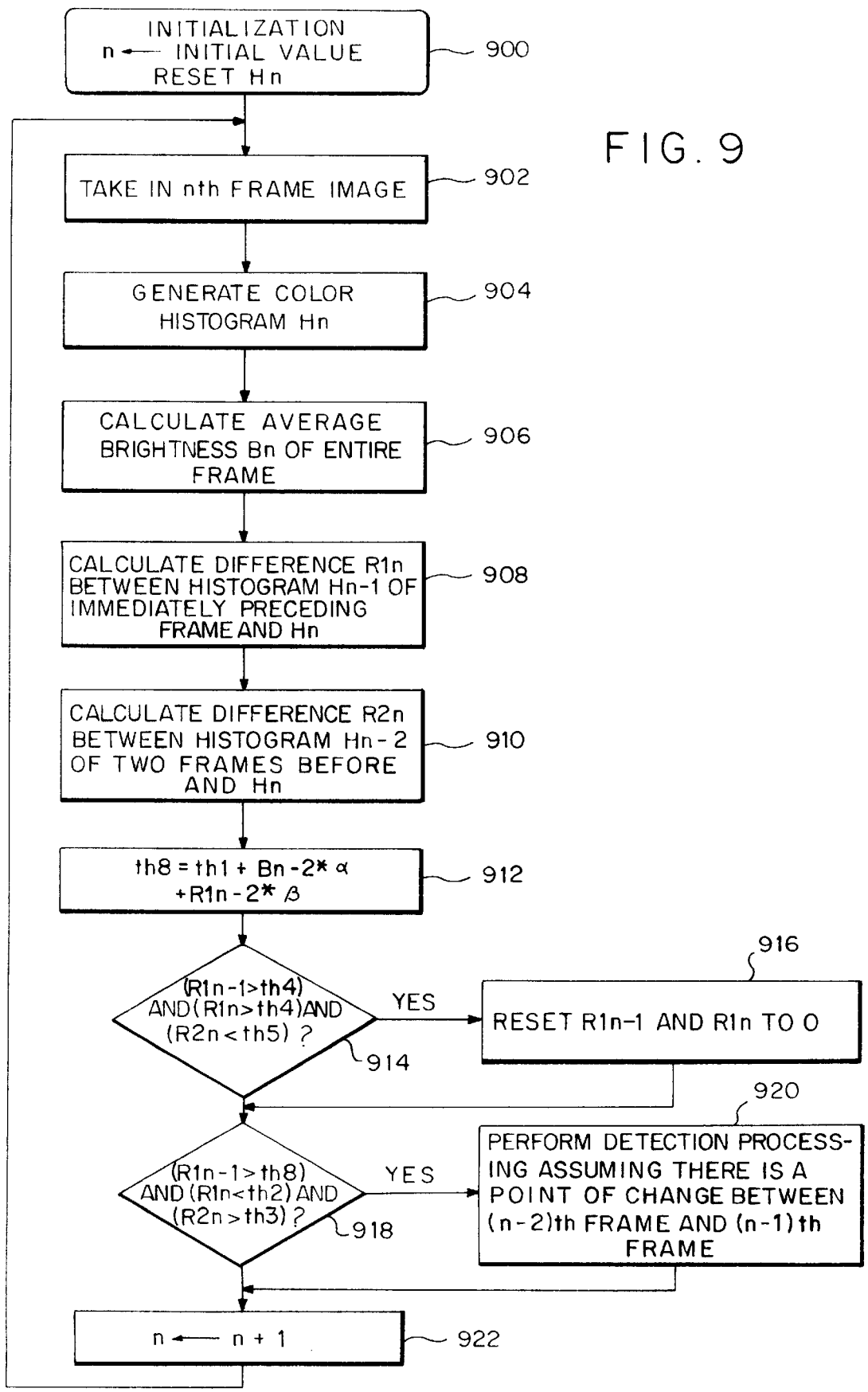
FIG. 9 is a flowchart of a point of change detection computer program that combines the computer programs of FIGS. 2 and 6.

Further, by combining the processing of FIG. 2 and the processing of FIG. 6, it is possible to realize a more reliable point of change detection processing for video. FIG. 9 illustrates a flowchart of a computer program embodying such a combination. The contents of processes making up the flowchart illustrated in FIG. 9 are already described above.

First, the CPU 7 as an initializing processing, sets the variable n representing the frame number of the current shot to be processed to an initial value to reset the memory area used for histogram (step 900). The initial value for n is given a start frame number of the video interval to be processed. Next, the CPU 7 takes in a frame image fn of the frame number n (step 902) and generates a color histogram Hn for the frame image fn (step 904). Then, the CPU 7 calculates the average brightness Bn (step 906), followed by a determination of the difference R1n between the color histogram Hn and the color histogram Hn−1 of the immediately preceding frame fn−1 (step 908). Further, calculation is performed to determine the difference R2n between Hn and the color histogram Hn−2 of the frame fn−2 two frames before (step 910). Next, the CPU 7 calculates the threshold th8 according to the feature of the immediately preceding video image (step 912). When R1n−1 and R1n are both greater than the threshold th4 and R2n is smaller than the threshold th5, this is taken to mean that an instantaneous disturbance has occurred (step 914). Then, when R1n−1 is greater than the threshold th8, R1n is smaller than the threshold th2, and R2n is greater than the threshold th3, it is decided that there is a change in video shots between frames fn−2 and fn−1 (step 918), and a variety of processes associated with the detection of change are performed (step 920). When the step 914 decides that the detected change is an instantaneous disturbance, R1n−1 and R1n are reset to zero (step 916). In the last step the CPU 7 increments by one the frame number to be processed and prepares for taking in the next frame (step 922).

Similar to the computer programs represented by the flowcharts illustrated in FIGS. 2 and 6, the computer program represented by the flowchart illustrated in FIG. 9 includes various code sections corresponding to the steps of the flowchart. Particularly, the code sections corresponding to steps 900–918 and 922 can be written in a high speed, low level computing programming language such as C or assembly language. The code section corresponding to step 920 can be written in a low-speed, high level computer programming language such as BASIC or some other interpretive language.

In the above described point of change detection processings for video, the correlation coefficient may be determined, as described in the literature cited above, by dividing the frame image into blocks, calculating the histogram for each divided block to determine the correlation coefficient for each block, and making an overall decision on the combination of these correlation coefficients to determine the correlation coefficient of the entire frame. This procedure produces an effect of increasing the difference in the correlation coefficient value between the point of change in video shots and other intervals.

In addition to detecting a point of change between video shots by using the above-described point of change detection processings for video, the user may wish to add and register a point of change by watching the video image being processed and specifying an appropriate location of change. Because of the limited response speed of humans, a significant length of time often passes from the moment the user has found an appropriate location of change and decided to register it until the user specification is conveyed to the computer. Because of this time delay, the specified location of change may intolerably deviate from the originally intended location of change. Hence, it might be convenient if apparatus is provided which registers a location of change by subtracting a preset time interval according to the response speed of the user from the originally specified location. Another apparatus may also be useful which, contrary to the above described apparatus, registers a location of change by adding a preset time interval to the original location.

According to the point of change detected, the video is divided into part intervals. If the division is made irrespective of voice, later editing of the video may become difficult. For example, if an interval is divided while a person in the video is talking, the talk will not make sense when only one divided part is seen. This poses a problem particularly in a video edit system that selects and rearranges individual shots divided by the detected points of change. Hence, when a point of change is detected, the voice signal is also checked. If this part of video has voice, the registration of change is not made until the voice is ended, i.e., a silent part is reached, at which time the point of change is registered. Whether the part being checked has voice or not can be determined from sound volume.

Figure 10:
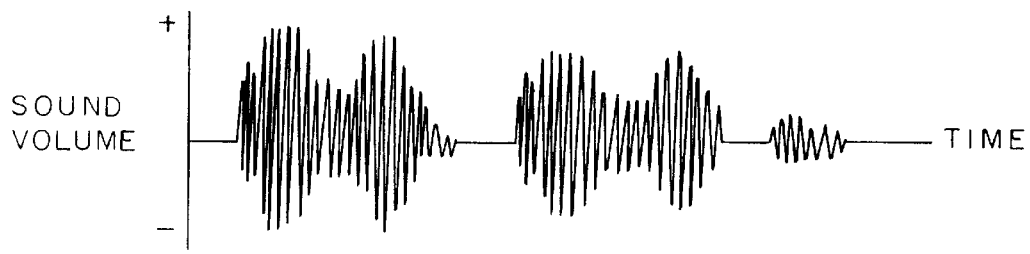
FIG. 10 is a diagram showing a typical example of a voice signal.

FIG. 10 shows a typical example of a voice signal. The abscissa represents time and the ordinate represents the amplitude of sound. Because the sound volume is the amplitude of sound, when the amplitude is smaller than a preset threshold, it can be treated as a silent part. There may be an instantaneous small amplitude even in a voiced part. To prevent erroneous decision, the sound amplitude is checked for a predetermined length of time to confirm that the small-amplitude state continues, before detecting the silent part. This procedure is applicable either to the case where the computer automatically detects a point of change or to a case where the user makes his own decision in detecting a point of change.

By dividing the video into shots according to the methods described above, search and edit can be done on the basis of the shots. For the user to be able to perform video manipulation in units of shots more easily, it would be convenient if the contents of each shot can be identified by a picture. When a point of change between shots is detected, the frame image at that instant is extracted as a representative image, whose size is changed to an appropriate one for search and edit applications and which is stored as a file in a storage such as disk so that it can be retrieved as required. Processing associated with such storing operation is performed, for example, in step 216 of FIG. 2.

In addition to the still picture of the frame image, it is possible to use as a representative image a moving image of a specified length of time starting from the detected point of change. As a representative image for the shot, it is often appropriate to use a picture some time after the point of change rather than a picture just at the point of change. It is therefore suited to use as the representative picture an image that is a specified time offset from the point of change. If the point of change detection processings described in FIGS. 2 and 9 are used, however, because only after several frames have passed from the point of change, can it be decided whether or not the detected change is really the point of change between shots, an attempt to extract a representative image when the decision is made will take in an image that is already a predetermined time offset from the point of change. In this case, if the user wants to pick up a frame image at the exact point of change between video shots, it may be convenient if several preceding frames are stored in a buffer. The buffer stores the latest frames and addition of one frame erases the oldest one in the buffer.

In search and edit operations, it is necessary that where in the original video recorded on video tape a shot identified by a representative image is located be able to be immediately known. For this purpose, apparatus is provided which stores the frame number and time code of the original video tape in connection with the representative image.

Other necessary information includes the duration of a shot, and actual time and date when the shot was broadcast on television. The time and date can easily be determined by reading the clock built into the computer, and the duration of shot can be calculated real time as a difference between times or frame numbers of two adjacent points of change. This information is also stored in connection with the representative image when the latter is stored.

Attribute information that the user added to each representative image as necessary is also related to the representative image when they are stored. Under the file management system for the general disk operating system (DOS), for example, the representative image and its associated information may be related with each other by assigning the associated information to a file of the same file name as the representative image but with a different extension. In more concrete terms, the representative image may be stored in a CUT00001.IMG, the associated time in a CUT00001.TIM, and the duration in a CUT00001.DUR. Because the video consists of a plurality of shots, however, this procedure results in the number of files becoming too large, making the management difficult. It is therefore possible to manage these information in a single file.

Figure 11:
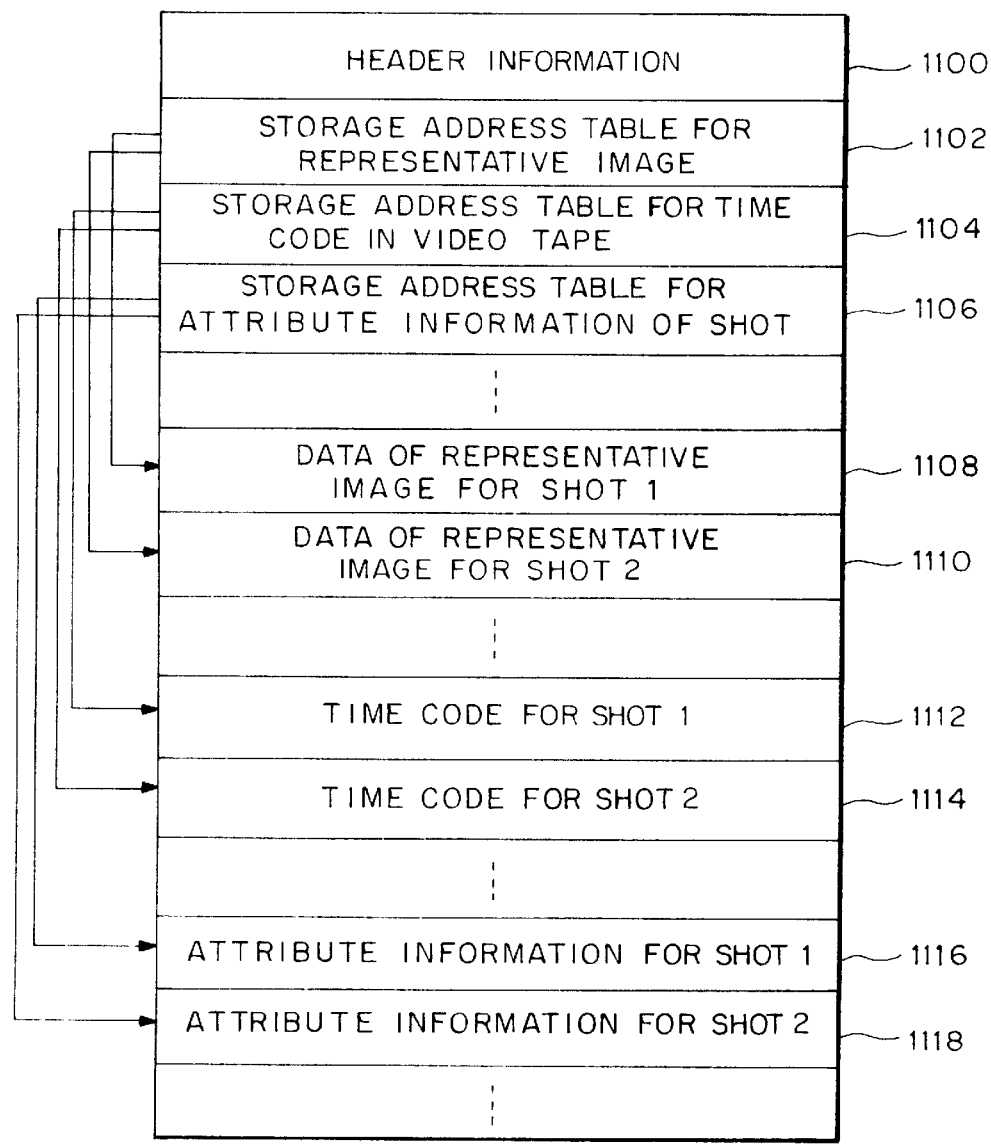
FIG. 11 is a diagram showing an example of a file structure.

FIG. 11 illustrates an example of a file structure for use in the present invention. 1100 is a header table which stores information related to the entire file, such as an identifier to discriminate against other file format and the total number of registered shots. A representative image storage address table 1102 successively stores the same number of offset values as the total number of shots, each offset value representing from which position in the file the data of the representative image of a shot is stored. Similarly, 1104 is a time code table and 1106 an attribute information table. When other related information is stored, necessary tables are prepared. These tables are so arranged that address information stored at the same locations in these tables from the head of the tables are related to the same representative image and are correlated to each other. 1108 to 1118 are data areas to store respective kinds of information.

Figure 12:
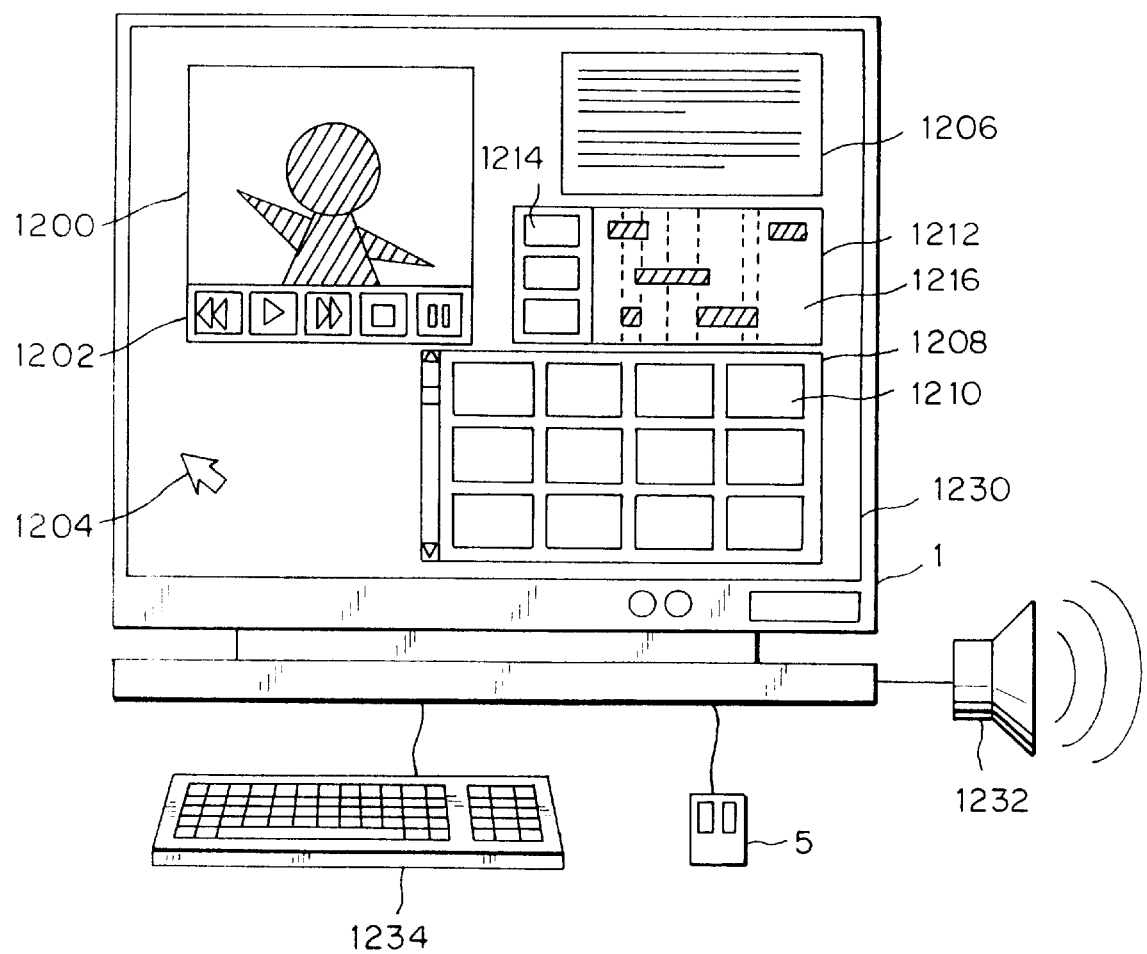
FIG. 12 is a diagram showing an example screen of a video edit system.

FIG. 12 illustrates an example screen of a video edit system that can locate the start of each shot of a video or a movie. 1 is the display, 1232 a speaker producing voice and background music, 5 an indirect pointing device such as mouse or a joystick, 1234 a keyboard, and 1230 a direct pointing device such as a touch panel.

A monitor window 1200 in the display 1 has an operation panel 1202 of the same type as a video tape recorder (VTR) and allows the user to freely replay a video. The video displayed on the monitor screen corresponds to text in a book, and the panel (button) operation corresponds to page turning. A lower right window 1208 displays a list of representative scenes for the shots, and a center right window 1212 shows a list of subjects that appear on the video. These lists are generally called indices. The list of scenes in the window 1208 is prepared by selecting typical frame images from a variety of scenes in the video through the point of change detection method, reducing the selected scenes in size and arranging them in chronological order as icons. These pictures may be considered as headings of scenes and correspond to the table of contents in a book. Each subject is one of the important constituent elements of a scene and in this respect, corresponds to a key word in a text. Hence, the list of subjects in the window 1212 corresponds to indices.

When the icon 1210 on the list of scenes is mouse-clicked, the video on the monitor screen is switched to a scene represented by the clicked icon. The list of subjects consists of icons 1214 indicating what the subject is and a display duration graph (bar graph) 1216 on the right side of the icons. The duration display graph (bar graph) indicates the time during which the subject appears in the video, with the left end of the bar representing the start of the video and the right end representing the end of the video. Clicking on the bar displays the video of that time interval on the monitor screen. 1204 is a cursor that moves according to the movement of the pointing device such as mouse. A window 1206 is a general input-output window to display a variety of information related to the video. By using such a graphical user interface, a user-friendly video editing is realized.

The present invention can be incorporated as a function of a video edit program into high-end systems for broadcasting stations, and into workstations and personal computers. Further, the present invention can be realized as one function of electronic devices such as VTR and TV and can also be developed into various equipment and systems that realize video on demand (VOD).

By use of the present invention, due to the ability to distinguish between an instantaneous image disturbance and a point of change between video shots, it is possible to prevent erroneous detection of a part having disturbances as a point of change between video shots and also to pick up only the part with the disturbance. In the present invention since the threshold for detecting a point of change can be dynamically changed according to the features of the immediately preceding video frame, it is possible to make a precise detection of a point of change according to the features of the video image, thus preventing erroneous detections.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of detecting a change between video shots from a video including a plurality of succeeding frame images, said method comprising the steps of:

inputting said video into a processing device;

obtaining a feature quantity of each frame of the inputted video;

determining a first correlation coefficient which is a difference between a feature quantity of a current frame image and a feature quantity of a first preceding frame image immediately preceding said current frame image;

determining a second correlation coefficient which is a difference between the feature quantity of said current frame image and a feature quantity of a second preceding frame at least two frame image preceding said current frame image; and indicating a change between video shots a time when the first correlation coefficient and the second correlation coefficient are out of predetermined allowable ranges;

wherein the number of frame images preceding said current frame image for said second preceding frame image is successively increased so as to distinguish a disturbance lasting an arbitrary number of frame images from a change between video shots.

2. A method according to claim 1, wherein said feature quantity is a color histogram.

3. A method according to claim 1, further comprising the steps of:

extracting a frame located at said change between video shots or a frame located at a position a predetermined offset from said change between video shots;

resizing the frame image to a preset size; and storing the resized frame in a storage device or a medium.

4. A method according to claim 3, further comprising the step of:

storing the resized frame image in a storage device or medium by relating it to at least one of four sets of associated information including first information representing a position of said change in video, second information representing a time when said change occurred, third information representing a distance or time between said change and an immediately preceding change in video, and fourth information describing attributes of said change or of a shot beginning with said change.

5. A method according to claim 4, wherein the video frame images and their related information are managed in a single file.

6. A method according to claim 3, wherein a buffer is used to store two or more latest frame images or resized frame images at all times so that when a change is detected in a preceding frame, the frame image containing said change is extracted from the buffer.

7. A method according to claim 1, wherein in indicating whether the first correlation coefficient and the second correlation coefficient are out of the predetermined allowable ranges, the predetermined allowable ranges are changed according to the feature quantity of an immediately preceding frame or an immediately following frame image.

8. A method according to claim 7, wherein the feature quantity of an immediately preceding frame image or an immediately following frame image is an overall brightness level of at least an immediately preceding frame image or at least an immediately following frame image.

9. A method according to claim 7, wherein the feature quantity of an immediately preceding frame image or an immediately following frame image is a correlation coefficient between the current frame image and an immediately preceding or following frame image.

10. A method according to claim 7, wherein the feature quantity of an immediately preceding frame image or an immediately following frame image is the number of frame images to be processed per unit time for the immediately preceding or following video image.

11. A method according to claim 1, wherein the number of frame images preceding said current frame image is successively increased for determining said second correlation coefficient in order to distinguish a disturbance lasting an arbitrary number of frame images from a change between video shots.

12. A system for detecting a change between video shots from a video including a plurality of succeeding frame images, said system comprising:

video playback apparatus for playing said video;

a display for displaying said video; and a processing device for obtaining a feature quantity of each frame of the inputted video, determining a first correlation coefficient which is a difference between a feature quantity of a current frame image and a feature quantity of a first preceding frame image immediately preceding said current frame image and determining a second correlation coefficient which is a difference between the feature quantity of the current frame image and a feature quantity of a second preceding frame image at least two frame images preceding said current frame image, and indicating on said display a change between video shots when the first correlation coefficient and the second correlation coefficient are out of predetermined allowable ranges;

wherein the number of images preceding said current frame images for said second preceding frame images is successively increased in order to distinguish a disturbance lasting an arbitrary number of frames from a change between video shots.

13. A system according to claim 12, wherein said feature quantity is a color histogram.

14. A system according to claim 12, further comprising:

means for extracting a frame located at the change in shot or a frame located at a position a predetermined offset from the change;

means for resizing the frame to a preset size; and means for storing the resized frame in a storage device or a medium.

15. A system according to claim 14, further comprising:

means for storing the resized frame image in a storage device or medium by relating it to at least one of four sets of associated information, including first information representing a position of the change in video, second information representing a time when the change occurred, third information representing a distance or time between the change and an immediately preceding change in video, and fourth information describing attributes of the change or of a shot beginning with the change.

16. A system according to claim 15, wherein the video frame images and their related information are managed in a single file.

17. A system according to claim 14, wherein a buffer is used to store two or more latest frame images or resized frame images at all times so that when of change is detected in a preceding frame image, the frame image containing the change is extracted from the buffer.

18. A system according to claim 12, wherein said processing device in indicating whether the first correlation coefficient and the second correlation coefficient are out of the predetermined allowable ranges, the predetermined allowable ranges are changed according to the feature quantity of an immediately preceding frame or an immediately following frame image.

19. A system according to claim 18, wherein the feature quantity of an immediately preceding frame or an immediately following frame image is an overall brightness level of at least an immediately preceding frame image or at least an immediately following frame image.

20. A system according to claim 18, wherein the feature quantity of an immediately preceding frame image or an immediately following frame image is a correlation coefficient between the current frame image and an immediately preceding or following frame image.

21. A system according to claim 18, wherein the feature quantity of an immediately preceding frame image or an immediately following frame image is the number of frames to be processed per unit time for the immediately preceding or following video image.

22. A system according to claim 12, wherein the number of frame images preceding said current frame image is successively increased for determining said second correlation coefficient in order to distinguish a disturbance lasting an arbitrary number of frame images from a change between video shots.

23. A computer program product for use with a computer having a display, said computer being used to detect a change between video shots from a video including a plurality of succeeding frame images, said computer program comprising:

a computer readable medium with the computer program recorded thereon, the computer program comprises:

a first code section for inputting video into a processing device, a second code section for obtaining a feature quantity of each frame of the inputted video, a third code section for determining a first correlation coefficient which is a difference between a feature quantity of a current frame image and a feature quantity of a first preceding frame image immediately preceding said current frame image and determining a second correlation coefficient which is a difference between the feature quantity of the current frame image and a feature quantity of a second preceding frame image at least two frame images preceding said current frame image, and a fourth code section for indicating a change between video shots when the first correlation coefficient and the second correlation coefficient are out of predetermined allowable ranges;

wherein the number of frame images preceding said current frame image for said second preceding frame image is successively increased in order to distinguish a disturbance lasting an arbitrary number of frame images from a change between video shots.

24. A computer program product according to claim 23, wherein said feature quantity is a color histogram.

25. A computer program product according to claim 23, further comprising:

a fifth code section for extracting a frame image located at the change in shot or a frame image located at a position a predetermined offset from the change;

a sixth code section for resizing the frame image to a preset size; and a seventh code section for storing the resized frame image in a storage device or a medium.

26. A computer program product according to claim 25, further comprising:

an eighth code section for storing the resized frame image in a storage device or medium by relating it to at least one of four sets of associated information including first information representing a position of the change in video, second information representing a time when the change occurred, third information representing a distance or time between the change in video and an immediately preceding point of change, and fourth information describing attributes of the change or of a shot beginning with the change.

27. A computer program product according to claim 26, wherein the video frame images and their related information are managed in a single file.

28. A computer program product according to claim 25, wherein a buffer is used to store two or more latest frame images or resized frame images at all times so that when a change in video is detected in a preceding frame image, the frame containing the change is extracted from the buffer.

29. A computer program product according to claim 23, wherein in indicating whether the first correlation coefficient and the second correlation coefficient are out of the predetermined allowable ranges, the predetermined allowable ranges are changed according to the feature quantity of an immediately preceding frame image or an immediately following frame image.

30. A computer program product according to claim 29, wherein the feature quantity of an immediately preceding frame image or an immediately following frame image is an overall brightness level of at least an immediately preceding frame image or at least an immediately following frame image.

31. A computer program product according to claim 29, wherein the feature quantity of an immediately preceding frame image or an immediately following frame is a correlation coefficient between the current frame image and an immediately preceding or following frame image.

32. A computer program product according to claim 29, wherein the feature quantity of an immediately preceding frame image or an immediately following frame image is the number of frame images to be processed per unit time for the immediately preceding or following video image.

33. A computer program product according to claim 23, wherein the number of frame images preceding said current frame image is successively increased for determining said second correlation coefficient in order to distinguish a disturbance lasting an arbitrary number of frame images from a point of change between video shots.

34. A computer program product for use with a computer having a display, said computer being used to detect a change between video shots from a video including a plurality of succeeding frame images, said computer program product comprising:

a logic circuit with the computer program product recorded thereon, the computer program comprises:

a first code second for inputting a video into a processing device, a second code section for obtaining a feature quantity of each frame of the inputted video, a third code section for determining a first correlation coefficient which is a difference between a feature quantity of current frame image and a feature quantity of a first preceding frame image immediately preceding said current frame image and determining a second correlation coefficient which is a difference between the feature quantity of the current frame image and a feature quantity of a second preceding frame image at least two frame images preceding said current frame image, and a fourth code section for indicating a change between video shots when the first correlation coefficient and the second correlation coefficient are out of predetermined allowable ranges;

wherein the number of frame images preceding said current frame image for said second preceding frame image is successively increased in order to distinguish a disturbance lasting an arbitrary number of frame images from a change between video shots.

35. A computer program product according to claim 34, wherein said feature quantity is a color histogram.

36. A computer program product according to claim 34, further comprising:
- a fifth code section for extracting a frame image located at the change in shot or a frame located at a position a predetermined offset from the change in video;
- a sixth code section for resizing the frame image to a preset size; and
- a seventh code section for storing the resized frame image in a storage device or a medium.

37. A computer program product according to claim 36, further comprising:
- an eighth code section for storing the resized frame image in a storage device or medium by relating it to at least one of four sets of associated information including first information representing a position of the change in video, second information representing a time when the change in video occurred, third information representing a distance or time between the change in video and an immediately preceding change, and fourth information describing attributes of the change in video or of a shot beginning with the change in video.

38. A computer program product according to claim 37, wherein the video frame images and their related information are managed in a single file.

39. A computer program product according to claim 36, wherein a buffer is used to store two or more latest frame images or resized frame images at all times so that when a change in video is detected in a preceding frame image, the frame containing the change is extracted from the buffer.

40. A computer program product according to claim 34, wherein in indicating whether the first correlation coefficient and the second correlation coefficient are out of the predetermined allowable ranges, the predetermined allowable ranges are changed according to the feature quantity of an immediately preceding frame image or an immediately following frame image.

41. A computer program product according to claim 40, wherein the feature quantity of an immediately preceding frame image or an immediately following frame image is an overall brightness level of at least an immediately preceding frame image or at least an immediately following frame image.

42. A computer program product according to claim 40, wherein the feature quantity of an immediately preceding frame image or an immediately following frame image is a correlation coefficient between the current frame image and an immediately preceding or following frame image.

43. A computer program product according to claim 40, wherein the feature quantity of an immediately preceding frame image or an immediately following frame image is the number of frame image to be processed per unit time for the immediately preceding or following video image.

44. A computer program product according to claim 34, wherein the number of frame images preceding said current frame image is successively increased for determining said second correlation coefficient in order to distinguish a disturbance lasting an arbitrary number of frame images from a change between video shots.

* * * * *